United States Patent
Nogami et al.

(10) Patent No.: US 12,286,373 B2
(45) Date of Patent: Apr. 29, 2025

(54) POWDER AND MIXED POWDER

(71) Applicant: DENKA COMPANY LIMITED, Tokyo (JP)

(72) Inventors: Naotsugu Nogami, Machida (JP); Takuto Okabe, Machida (JP); Motoharu Fukazawa, Machida (JP)

(73) Assignee: DENKA COMPANY LIMITED, Tokyo (JP)

( * ) Notice: Subject to any disclaimer, the term of this patent is extended or adjusted under 35 U.S.C. 154(b) by 1200 days.

(21) Appl. No.: 16/969,298

(22) PCT Filed: Mar. 14, 2019

(86) PCT No.: PCT/JP2019/010603
§ 371 (c)(1),
(2) Date: Aug. 12, 2020

(87) PCT Pub. No.: WO2019/177112
PCT Pub. Date: Sep. 19, 2019

(65) Prior Publication Data
US 2020/0399169 A1 Dec. 24, 2020

(30) Foreign Application Priority Data

Mar. 16, 2018 (JP) ................. 2018-049498
Oct. 31, 2018 (JP) ................. 2018-205821

(51) Int. Cl.
| C03C 12/00 | (2006.01) |
| C03C 3/085 | (2006.01) |
| C03C 10/00 | (2006.01) |
| C08K 3/22  | (2006.01) |
| C08K 3/36  | (2006.01) |

(52) U.S. Cl.
CPC .............. *C03C 12/00* (2013.01); *C03C 3/085* (2013.01); *C03C 10/0009* (2013.01); *C08K 3/22* (2013.01); *C08K 3/36* (2013.01); *C08K 2003/2227* (2013.01); *C08K 2003/2296* (2013.01)

(58) Field of Classification Search
CPC .............. C03C 12/00; C08K 3/40; C08K 3/36
See application file for complete search history.

(56) References Cited

U.S. PATENT DOCUMENTS

| 3,681,097 A | 8/1972 | Beall et al. |
| 3,951,669 A | 4/1976 | Malmendier et al. |
| 2022/0169832 A1* | 6/2022 | Okabe ................. C01B 33/18 |

FOREIGN PATENT DOCUMENTS

| CN | 1483009 A | 3/2004 |
| CN | 1611458 A | 5/2005 |
| CN | 102245534 A | 11/2011 |
| CN | 102264669 A | 11/2011 |
| CN | 105143131 A | 12/2015 |
| CN | 105899468 A | 8/2016 |
| GB | 1008498 | 10/1965 |
| JP | S47-004979 A | 3/1972 |
| JP | S62-180780 A | 8/1987 |
| JP | H02-208256 A | 8/1990 |
| JP | H11-228173 A | 8/1999 |
| JP | 2007-091577 A | 4/2007 |
| SU | 1313817 A1 | 5/1987 |
| WO | WO 2016/084627 A1 | 6/2016 |

OTHER PUBLICATIONS

J.E. Shelby, Introduction to Glass Science and Technology, 2005, The Royal Society of Chemistry, 2nd Edition, pp. i-xvi, 26-50, 275-291. (Year: 2005).*
China National Intellectual Property Administration, Office Action in Chinese Patent Application No. 201980009618.5 (Dec. 16, 2021).
European Patent Office, Extended European Search Report in European Patent Application No. 19766857.7 (Mar. 29, 2021).
Japan Patent Office, Written Opinion of the International Searching Authority in International Application No. PCT/JP2019/010603 (May 7, 2019).
The International Bureau of WIPO, International Preliminary Report on Patentability in International Application No. PCT/JP2019/010603 (Oct. 1, 2020).
Sternitzke et al., "Crystal structure and thermal expansion of quartz-type aluminosilicates," *Journal of Materials Science*, 26: 3051-3056 (1991).
Japan Patent Office, International Search Report in International Application No. PCT/JP2019/010603 (May 7, 2019).

* cited by examiner

*Primary Examiner* — Elizabeth A. Bolden
(74) *Attorney, Agent, or Firm* — Leydig, Voit & Mayer, Ltd.

(57) ABSTRACT

One aspect of the present invention provides a powder containing three components of ZnO, $Al_2O_3$ and $SiO_2$, wherein each content of the three components is ZnO: 17 to 43% by mole, $Al_2O_3$: 9 to 20% by mole and $SiO_2$: 48 to 63% by mole, based on the sum of the contents of the three components.

13 Claims, 1 Drawing Sheet

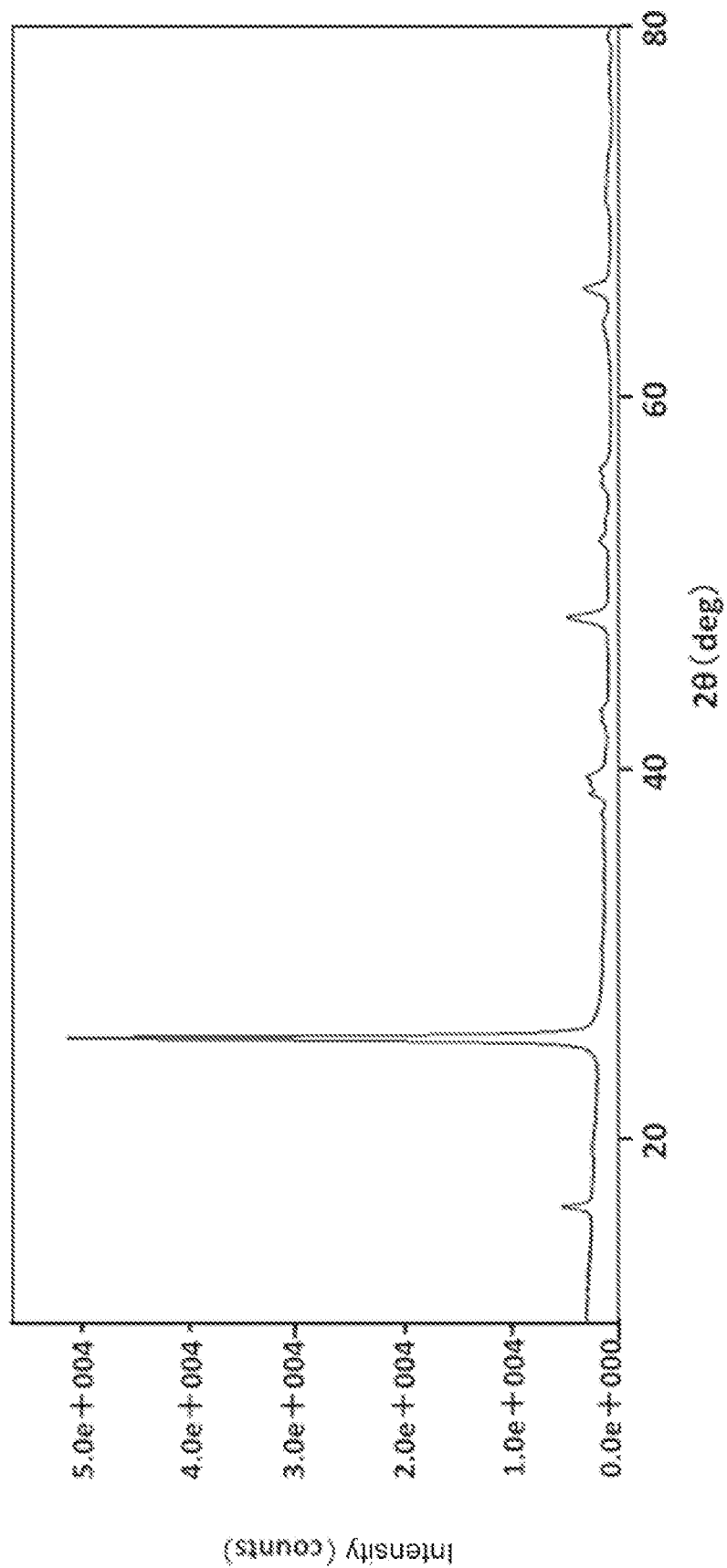

POWDER AND MIXED POWDER

CROSS-REFERENCE TO RELATED APPLICATIONS

This patent application is the U.S. national phase of International Application No. PCT/JP2019/010603, filed on Mar. 14, 2019, which claims the benefit of Japanese Patent Application No. 2018-049498, filed Mar. 16, 2018 and Japanese Patent Application No. 2018-205821, filed Oct. 31, 2018, the disclosures of all of which are incorporated herein by reference in their entireties for all purposes.

TECHNICAL FIELD

The present invention relates to powder and mixed powder.

BACKGROUND ART

In general, various powdery fillers are used for the purpose of improving the physical properties or functions of base materials such as glass materials and resin materials. For example, amorphous silica is used as a filler for controlling the thermal expansion coefficient of a base material since it has a small thermal expansion coefficient of about $0.5 \times 10^{-6}/°$ C. and is relatively easily available. However, when the filler is added to a base material used for bonding, sealing, molding, or the like, a filler having a thermal expansion coefficient smaller than that of amorphous silica is desired in order to match the thermal expansion coefficient of the filler with that of the base material and suppress the occurrence of thermal stress.

Many materials such as zirconium phosphate, zirconium tungstate and manganese nitride are known as materials having a smaller thermal expansion coefficient than amorphous silica. However, since the specific gravity of these materials is large and the weight of the resin material and the like after blending becomes heavy, it is not general to use them for electronic parts and the like. In order to compensate for this drawback, Patent Document 1 discloses $SiO_2$—$TiO_2$ glass, $Li_2O$—$Al_2O_3$—$SiO_2$-based crystallized glass, and $ZnO$—$Al_2O_3$—$SiO_2$-based crystallized glass, as lightweight materials having a small thermal expansion coefficient. Patent Document 2 discloses an inorganic powder having one or more crystalline phases selected from β-eucryptite, β-eucryptite solid solution, β-quartz, and β-quartz solid solution. Non-Patent Document 1 discloses $Zn_{0.5}AlSi_2O_6$, $LiAlSi_2O_6$, and $LiAlSiO_4$.

CITATION LIST

Patent Document

[Patent Document 1] Japanese Patent Laid-Open No. 2-208256
[Patent Document 2] Japanese Patent Laid-Open No. 2007-91577

Non-Patent Document

[Non-patent Document 1] Journal of Materials Science 26 p. 3051 (1991)

SUMMARY OF INVENTION

Technical Problem

An object of the present invention is to provide a powder excellent in the effect of reducing the thermal expansion coefficient when blended in a base material, and a mixed powder using the powder.

Solution to Problem

The present invention provides the following powder and mixed powder.
(1) A powder comprising three components of ZnO, $Al_2O_3$ and $SiO_2$, wherein each content of the three components is ZnO: 17 to 43% by mole, $Al_2O_3$: 9 to 20% by mole and $SiO_2$: 48 to 63% by mole, based on the sum of the contents of the three components.
(2) The powder according to (1), having an average circularity of 0.60 or more.
(3) The powder according to (1) or (2), comprising 50% by mass or more of a β-quartz solid solution as a crystalline phase, based on the total amount of the powder.
(4) The powder according to any one of (1) to (3), wherein each content of Li, Na and K is less than 100 ppm by mass based on the total amount of the powder.
(5) The powder according to any one of (1) to (4), being used by being blended in a glass or a resin.
(6) A mixed powder comprising: a first powder being the powder according to any one of (1) to (4); and a second powder being different from the first powder.
(7) The mixed powder according to (6), wherein an average circularity of the second powder is 0.80 or more.
(8) The mixed powder according to (6) or (7), wherein a content of the first powder is 10% by volume or more based on the total amount of the mixed powder.
(9) The mixed powder according to any one of (6) to (8), wherein the second powder is a silica powder or an alumina powder.
(10) The mixed powder according to any one of (6) to (9), being used by being blended in a glass or a resin.

Advantageous Effects of Invention

The present invention can provide a powder excellent in the effect of reducing the thermal expansion coefficient when blended in a base material, and a mixed powder using the powder.

BRIEF DESCRIPTION OF DRAWINGS

The FIGURE is an X-ray diffraction pattern of a powder according to Example 2.

DESCRIPTION OF EMBODIMENTS

Hereinafter, embodiments of the present invention will be described. However, the present invention is not limited to the following embodiments.

The powder according to one embodiment contains three components of ZnO, $Al_2O_3$ and $SiO_2$. Each content of the three components is ZnO: 17 to 43% by mole, $Al_2O_3$: 9 to 20% by mole, and $SiO_2$: 48 to 63% by mole, based on the sum of the contents of the three components.

The content of ZnO is 17 to 43% by mole based on the total content of the three components, and is preferably 20 to 40% by mole, more preferably 22 to 39% by mole, and still more preferably 25 to 35% by mole, from the viewpoint of further excellent effect of reducing the thermal expansion coefficient of the base material. The content of ZnO may be 17 to 40% by mole, 17 to 39% by mole, 17 to 35% by mole, 20 to 43% by mole, 20 to 39% by mole, 20 to 35% by mole, 22 to 43% by mole, 22 to 40% by mole, 22 to 35% by mole, 25 to 43% by mole, 25 to 40% by mole, or 25 to 39% by mole, based on the total content of the three components.

The content of $Al_2O_3$ is 9 to 20% by mole, preferably 10 to 19% by mole, and more preferably 11 to 18% by mole, based on the total content of the three components. The content of $Al_2O_3$ may be 9 to 19% by mole, 9 to 18% by mole, 10 to 20% by mole, 10 to 18% by mole, 11 to 20% by mole, or 11 to 19% by mole, based on the total content of the three components.

The content of $SiO_2$ is 48 to 63% by mole, preferably 49 to 62% by mole, more preferably 50 to 62% by mole, and still more preferably 50 to 55% by mole, based on the total content of the three components. The content of $SiO_2$ may be 48 to 62% by mole, 48 to 55% by mole, 49 to 63% by mole, 49 to 55% by mole, or 50 to 63% by mole, based on the total content of the three components.

The thermal expansion coefficient of the base material in which the powder is blended can be reduced since the powder has the above-described composition. In addition, in the production of the powder, the raw material can be easily melted, and crystallization can be facilitated. In particular, the thermal expansion coefficient of the base material in which the powder is blended can be further reduced since the powder has the composition in which the content of ZnO is 25 to 35% by mole, the content of $Al_2O_3$ is 11 to 18% by mole, and the content of $SiO_2$ is 50 to 55% by mole, based on the total content of the three components.

The powder may contain ionic impurities, which are inevitable impurities, but the content thereof is preferably as small as possible from the viewpoint of improving moisture resistance reliability and suppressing failure of electronic devices. Examples of the ionic impurities include alkali metals such as Li, Na, and K. In the powder of the present embodiment, the total content of Li, Na, and K is preferably less than 500 ppm by mass, more preferably less than 300 ppm by mass, and still more preferably less than 200 ppm by mass, based on the total amount of the powder.

The content of Li is preferably less than 100 ppm by mass, more preferably less than 50 ppm by mass, and still more preferably less than 20 ppm by mass, based on the total amount of the powder. The content of Na is preferably less than 100 ppm by mass, more preferably less than 90 ppm by mass, and still more preferably less than 80 ppm by mass, based on the total amount of the powder. The content of K is preferably less than 100 ppm by mass, more preferably less than 70 ppm by mass, and still more preferably less than 40 ppm by mass, based on the total amount of the powder.

The powder may further contain zirconium oxide, titanium oxide, or the like as long as the thermal expansion coefficient is not affected. From the viewpoint of further improving the effect of reducing the thermal expansion coefficient of the base material, the content of the above-described three components is preferably 95% by mole or more, more preferably 98% by mole or more, and still more preferably 99% by mole or more, based on the total amount of the powder. From the same viewpoint, in one embodiment, the powder may consist of the above-described three components and inevitable impurities, or may consist of the above-described three components.

The powder of the present embodiment preferably contains a β-quartz solid solution as a crystalline phase. The powder may contain β-quartz solid solution as the main crystal. The content of the β-quartz solid solution is preferably 50% by mass or more, more preferably 60% by mass or more, still more preferably 70% by mass or more, and may be 72% by mass or more, or 75% by mass or more, based on the total amount of the powder. The content of the β-quartz solid solution is preferably as large as possible. When the content of the β-quartz solid solution is within the above range, the thermal expansion coefficient of the powder itself is reduced, and thus the thermal expansion coefficient of the base material can be further reduced. In particular, when the content of the β-quartz solid solution is 70% by mass or more, the thermal expansion of the base material is more effectively reduced by the powder. Further, since the blending amount (filling amount) of the powder in the base material can be increased, the thermal expansion coefficient of the base material can be easily controlled. The structure of the β-quartz solid solution of the powder in the present embodiment can be expressed as $xZnO\text{-}yAl_2O_3\text{-}zSiO_2$. Identification of the crystalline phase and measurement of the content thereof can be performed by powder X-ray diffraction measurement/Rietveld method.

The powder may further contain an amorphous phase in addition to the β-quartz solid solution phase, or may further contain another crystalline phase. The powder may contain a willemite phase ($Zn_2SiO_4$) as another crystalline phase. If the powder contains, among other crystalline phases, a gahnite phase ($ZnAl_2O_4$), a mullite phase ($Al_6Si_2O_{13}$) and a cristobalite phase ($SiO_2$), the thermal expansion coefficient is relatively high. Therefore, the powder preferably does not contain these crystalline phases.

The shape of the powder may be spherical, cylindrical, prismatic, or the like, but is preferably spherical. Whether or not the powder is spherical can be confirmed by calculating the average circularity of the powder. The average circularity in the present specification is determined as follows. That is, a projected area (S) and a projected peripheral length (L) of particles (powder particles) photographed using an electron microscope are obtained, and the circularity is calculated by applying them to the following formula (1). The average circularity is an average value of the circularities of all the particles included in a certain observation area (an area including 100 or more particles).

$$\text{Circularity} = 4\pi S/L^2 \qquad (1)$$

The average circularity is preferably as large as possible, and is preferably 0.60 or more, more preferably 0.70 or more, still more preferably 0.80 or more, particularly preferably 0.85 or more, and most preferably 0.90 or more. As a result, the rolling resistance of the particles when mixed with the base material is reduced, the viscosity of the base material is reduced, and the fluidity of the base material can be improved. In particular, when the average circularity is 0.90 or more, the fluidity of the base material is further increased, so that the base material can be highly filled with the powder, and the thermal expansion coefficient can be easily reduced.

The average particle diameter of the powder is not particularly limited, but may be 0.5 to 100 μm, or may be 1 to 50 μm, considering that the powder is used as a filler blended in a base material. The average particle diameter of the powder can be determined by calculating a particle size distribution using a laser diffraction particle size distribution analyzer, multiplying the measured particle diameter by the relative particle amount (difference %), and dividing by the total relative particle amount (100%). The "%" means "% by volume".

The thermal expansion coefficient of the powder is preferably as small as possible, and is preferably $2\times10^{-6}/°$ C. or less, more preferably $1\times10^{-6}/°$ C. or less, and still more preferably $0.5\times10^{-6}/°$ C. or less, from the viewpoint of further reducing the thermal expansion coefficient of the base material in which the powder is blended. The thermal expansion coefficient can be measured by thermomechanical analysis (TMA).

Next, a method for producing the powder of the present embodiment will be described. A method for producing a powder according to an embodiment includes a step of producing a raw material powder (raw material powder producing step), a step of forming the raw material powder into a spherical shape (spheroidizing step), and a step of crystallizing the raw material powder (crystallizing step). The production method preferably includes the raw material powder step, the spheroidizing step, and the crystallization step in this order.

In the raw material powder preparation step, first, raw materials are mixed to prepare a raw material mixture. The raw material may be zinc oxide or the like as a Zn source, aluminum oxide or aluminum hydroxide or the like as an Al source, and silicon oxide (α-quartz, cristobalite, amorphous silica or the like) as a Si source.

The blending amounts of the raw materials may be 17 to 43% by mole of the Zn source, 9 to 20% by mole of the Al source, and 48 to 63% by mole of the Si source, based on the total amount of the raw materials of the Zn source, the Al source, and the Si source.

In the raw material powder preparation step, in addition to the above-described raw materials, a general nucleating agent such as zirconium oxide or titanium oxide may be added within a range not affecting the thermal expansion coefficient.

Also in the raw material mixture, the content of ionic impurities is preferably as small as possible. The content of the alkali metals contained in the raw material mixture is preferably 500 ppm by mass or less, more preferably 150 ppm by mass or less, still more preferably 100 ppm by mass or less, particularly preferably 50 ppm by mass or less, from the viewpoint of improving moisture resistance reliability and suppressing failure of electronic devices.

The method of mixing the raw material oxides is not particularly limited as long as it is a method in which alkali metals such as Na, Li, or K and metal elements such as Fe are hardly mixed, and for example, a method of mixing the raw material oxides using a grinder such as an agate mortar, a ball mill, or a vibration mill, or various mixers may be used.

In the raw material powder preparation step, next, the raw material mixture is placed in a container such as a platinum crucible or an alumina crucible, melted in a heating furnace such as an electric furnace, a high-frequency furnace, or an image furnace, or a flame burner, and then the melt is taken out into air or water and quenched. Thus, the raw material glass is obtained. The obtained raw material glass is pulverized to obtain a raw material powder. The method of pulverizing the raw material glass is not particularly limited, and may be a method using an agate mortar, a ball mill, a vibration mill, a jet mill, a wet jet mill, or the like. The pulverization may be performed in a dry manner, or may be performed in a wet manner by mixing a liquid such as water or alcohol with the raw material powder.

In the spheroidizing step, the raw material powder is spheroidized by a powder melting method. The spheroidizing method by the powder melting method is a method in which a raw material powder is charged into a chemical flame, a thermal plasma, a vertical tubular furnace or a tower kiln, melted, and spheroidized by its own surface tension.

In the powder melting method, the particle size distribution after spheroidization can be adjusted by adjusting the particles obtained by pulverizing the raw material glass or the particles obtained by granulating the raw material powder with a spray dryer or the like to have a desired particle size distribution. These particles are put into a chemical flame or thermal plasma, a vertical tubular furnace, a tower kiln, or the like while suppressing aggregation of the particles, and are melted to be spheroidized. Alternatively, a dispersion liquid of the raw material powder dispersed in a solvent or the like may be prepared, and the liquid raw material may be sprayed into a chemical flame, a thermal plasma, a vertical tubular furnace, a tower kiln, or the like using a nozzle or the like to evaporate the dispersion medium, and then the raw material powder may be melted.

In the powder melting method, the chemical flame refers to a flame generated by burning a combustible gas with a burner. As the combustible gas, it is sufficient that a temperature equal to or higher than the melting point of the raw material powder can be obtained, and for example, natural gas, propane gas, acetylene gas, liquefied petroleum gas (LPG), hydrogen, or the like can be used. Air, oxygen, or the like as a combustion-supporting gas may be used in combination with the combustible gas. Conditions such as the size and temperature of the chemical flame can be adjusted by the size of the burner and the flow rates of the combustible gas and the combustion-supporting gas.

In the crystallization step, the raw material powder is heated at a high temperature to be crystallized. As an apparatus for crystallization, any heating apparatus may be used as long as a desired heating temperature can be obtained, and for example, an electric furnace, a rotary kiln, a pusher furnace, a roller hearth kiln, or the like can be used.

The temperature for heat crystallization (crystallization temperature) is preferably 750 to 900° C. By setting the heating temperature to 750° C. or higher, the crystallization time can be shortened, and the content of the β-quartz solid solution phase can be increased by sufficient crystallization. Therefore, the thermal expansion coefficient of the base material in which the powder is blended can be further reduced. When the crystallization temperature is 900° C. or lower, a crystalline phase other than the β-quartz solid solution phase, for example, a gahnite phase, a cristobalite phase, a willemite phase, or the like, is less likely to be formed, and the thermal expansion coefficient of the base material in which the powder is blended can be further reduced.

The heating time (crystallization time) is preferably 1 to 24 hours. When the heating time is 1 hour or more, crystallization into the β-quartz solid solution phase is sufficiently performed, and the thermal expansion coefficient of the base material in which the powder is blended can be further reduced. When the heating time is 24 hours or less, the cost can be suppressed. Through the crystallization step, the powder according to the present embodiment can be obtained.

The powder obtained in the crystallization step may be an aggregate in which a plurality of particles are aggregated. The aggregate itself may be used as a powder, or the aggregate may be disintegrated as necessary and then used as a powder. The method of crushing the aggregates is not particularly limited, and may be a method using an agate mortar, a ball mill, a vibration mill, a jet mill, a wet jet mill, or the like. The disintegration may be performed in a dry manner, or may be performed in a wet manner by mixing with a liquid such as water or alcohol. In the wet disintegration, the powder of the present embodiment is obtained by drying after disintegration. The drying method is not particularly limited, and may be heat drying, vacuum drying, freeze drying, supercritical carbon dioxide drying, or the like.

In another embodiment, the method for producing the powder may further include a step of classifying the powder so as to obtain a desired average particle diameter, and a surface treatment step using a coupling agent. By performing the surface treatment, the blending amount (filling amount) to the base material can be further increased. The coupling agent used for the surface treatment is preferably a silane coupling agent. The coupling agent may be a titanate coupling agent, an aluminate-based coupling agent, or the like.

A mixed powder can be obtained by using the above powder and a powder having a composition different from that of the above powder. That is, the mixed powder according to one embodiment contains a first powder composed of the above-described powder and a second powder different from the first powder. By mixing the above-mentioned powder and the second powder, it is possible to more easily adjust the thermal expansion coefficient, the thermal conductivity, the filling rate, and the like when the powder is blended in the base material.

Examples of the second powder include powders of inorganic oxides such as silica and alumina. Silica or alumina having a higher purity is preferable. Since the thermal conductivity of silica is small, when silica is used as the second powder, the thermal expansion coefficient of the base material can be further reduced. When alumina is used as the second powder, the thermal conductivity of the base material can be easily adjusted.

The shape of the powder may be the same as that of the above-described powder (first powder), and is preferably spherical. From the same viewpoint as the above-described powder (first powder), the average circularity of the second powder is preferably as large as possible, and is preferably 0.80 or more, more preferably 0.85 or more, and still more preferably 0.90 or more. The average circularity of the second powder is calculated by the same method as the average circularity of the powder described above (first powder).

The average particle diameter (median diameter ($D_{50}$)) of the second powder may be 0.01 μm or more, 0.05 μm or more, or 0.1 μm or more, and is preferably 3 μm or less, more preferably 2 μm or less, and still more preferably 1 μm or less. This can reduce the viscosity of the base material containing the mixed powder. The average particle diameter (median diameter ($D_{50}$)) of the second powder may be 0.01 to 3 μm, 0.05 to 3 μm, 0.1 to 3 μm, 0.01 to 2 μm, 0.05 to 2 μm, 0.1 to 2 μm, 0.01 to 1 μm, 0.05 to 1 μm, or 0.1 to 1 μm.

From the same viewpoint, the average particle diameter (median diameter ($D_{50}$)) of the second powder is preferably 10 μm or more, more preferably 20 μm or more, and even more preferably 30 μm or more, and may be 100 μm or less, 90 μm or less, or 80 μm or less. The average particle diameter (median diameter ($D_{50}$)) of the second powder may be 10 to 100 μm, 20 to 100 μm, 30 to 100 μm, 10 to 90 μm, 20 to 90 μm, 30 to 90 μm, 10 to 80 μm, 20 to 80 μm, or 30 to 80 μm.

The content of the second powder in the mixed powder is preferably 90% by volume or less, more preferably 70% by volume or less, still more preferably 50% by volume or less, particularly preferably 40% by volume or less, based on the total amount of the mixed powder. This makes it possible to more effectively reduce the thermal expansion coefficient of the base material. The content of the second powder may be 0.1% by volume or more, preferably 1% by volume or more. The content of the second powder in the mixed powder may be 0.1 to 90% by volume, 1 to 90% by volume, 0.1 to 70% by volume, 1 to 70% by volume, 0.1 to 50% by volume, 1 to 50% by volume, 0.1 to 40% by volume, or 1 to 40% by volume, based on the total amount of the mixed powder.

The content of the first powder in the mixed powder is preferably 10% by volume or more, more preferably 30% by volume or more, still more preferably 50% by volume or more, particularly preferably 60% by volume or more, based on the total amount of the mixed powder, from the viewpoint of effectively reducing the thermal expansion coefficient of the base material. The content of the first powder in the mixed powder may be, for example, 99.9% by volume or less, preferably 99% by volume or less, based on the total amount of the mixed powder. The content of the first powder in the mixed powder may be 10 to 99.9% by volume, 10 to 99% by volume, 30 to 99.9% by volume, 30 to 99% by volume, 50 to 99.9% by volume, 50 to 99% by volume, 60 to 99.9% by volume, or 60 to 99% by volume, based on the total amount of the mixed powder.

The total amount of the first powder and the second powder in the mixed powder may be 90% by volume or more, 92% by volume or more, or 95% by volume or more based on the total amount of the mixed powder. The mixed powder may consist of only the first powder and the second powder.

The mixed powder may further contain another powder having a different composition from the first powder and the second powder. When the second powder is a silica powder, the other powder may be an alumina powder. When the second powder is an alumina powder, the other powder may be a silica powder. The other powder may be, for example, at least one powder selected from the group consisting of zinc oxide, titanium oxide, magnesium oxide, and zirconium oxide. When the mixed powder contains another powder, the content of the other powder may be, for example, 0.1 to 10% by volume based on the total amount of the mixed powder.

The powder or mixed powder of the present embodiment may be used by being blended in a base material. The base material may be glass in one embodiment. Examples of the glass include glasses having a composition of PbO—$B_2O_3$—ZnO type, PbO—$B_2O_3$—$Bi_2O_3$ type, PbO—$V_2O_5$—$TeO_2$ type, $SiO_2$—ZnO-$M^1{}_2O$ ($M^1{}_2O$ is an alkali metal oxide) type, $SiO_2$—$B_2O_3$-$M^1{}_2O$ type, or $SiO_2$—$B_2O_3$-$M^2O$ type ($M^2O$ is an alkaline earth metal oxide).

The base material may be a resin in other embodiments. Examples of the resin include epoxy resin, silicone resin, phenol resin, melamine resin, urea resin, unsaturated polyester, fluororesin, polyamide (polyimide, polyamideimide, polyetherimide, etc.), polybutylene terephthalate, polyester (polyethylene terephthalate, etc.), polyphenylene sulfide, wholly aromatic polyester, polysulfone, liquid crystal polymer, polyethersulfone, polycarbonate, maleimide-modified resin, ABS (acrylonitrile-butadiene-styrene) resin, AAS (acrylonitrile-acrylic rubber-styrene) resin, and AES (acrylonitrile-ethylene-propylene-diene rubber-styrene) resin. The base material may be a mixture of these resins.

The blending amount (filling amount) of the powder in the base material is appropriately selected according to physical properties such as a target thermal expansion coefficient. The blending amount of the powder may be 30 to 95% by volume, preferably 40 to 90% by volume, based on the total amount of the base material after the addition of the powder.

When the mixed powder is blended in the base material, the first powder and the second powder may be mixed in the base material, or the first powder and the second powder may be mixed in advance and then blended in the base material.

By blending the powder or mixed powder of the present embodiment into the base material, the viscosity of the base material after blending the powder or mixed powder can be lowered. The base material in which the powder or the mixed powder of the present embodiment is blended has a low viscosity and thus has good fluidity and excellent moldability. When the powder or the mixed powder of the present embodiment is blended, the blending amount (filling rate) can be increased.

EXAMPLES

Hereinafter, the present invention will be described in more detail with reference to examples, but the present invention is not limited to the examples.

Example 1 (Raw Material Powder Preparation Step)

As shown in Table 1, zinc oxide, aluminum oxide and silicon dioxide were each used as raw materials, and these raw materials were mixed by a vibration mixer (manufactured by Resodyn, Lab RANI II). 100 g of this mixture was placed in a platinum crucible and heated and melted in an electric furnace. At this time, the temperature in the electric furnace during melting was 1600° C., and the holding time at 1600° C. was 30 minutes. After melting, the crucible was immersed in water and quenched to obtain a raw material glass. The raw material glass was recovered from the platinum crucible and pulverized by a ball mill so as to have an average particle diameter of 5 μm to obtain a raw material powder.
(Spheroidizing Step)

The obtained raw material powder was charged into a high-temperature flame formed by LPG and oxygen gas by a carrier gas (oxygen), and spheroidized by a powder melting method.
(Crystallization Step)

The spheroidized powder was pulverized, placed in an alumina crucible, and crystallized in an air atmosphere using an electric furnace at a furnace temperature of 800° C. for 1 hour at 800° C. Thus, a powder according to Example 1 was obtained.

Examples 2 to 7

Powders according to Examples 2 to 7 were obtained in the same manner as in Example 1, except that the blending amounts of the raw materials were set to the compositions shown in Table 1, and further, in the crystallization step, crystallization was performed using an electric furnace at a furnace temperature of 800° C. for a holding time of 4 hours at 800° C.

Example 8

A powder according to Example 8 was obtained in the same manner as in Example 1, except that in the method of Example 1, the spheroidizing step was not performed, and in the crystallization step, crystallization was performed using an electric furnace at a furnace temperature of 800° C. for a holding time of 4 hours at 800° C.

Example 9 (Mixing Step)

A powder obtained in the same manner as in Example 8 was used as a first powder, and spherical silica (FB-40R ($D_{50}$=40 μm), manufactured by Denka Co., Ltd.) was used as a second powder. The second powder was mixed so as to be 50% by volume with respect to the first powder to obtain a mixed powder according to Example 9 (content of the second powder based on the total amount of the mixed powder: 33% by volume).

Example 10 (Mixing Step)

The powder obtained in Example 2 was used as a first powder, and spherical silica (SFP-30M ($D_{50}$=0.3 μm), manufactured by Denka Co., Ltd.) was used as a second powder. The second powder was mixed so as to be 25% by volume with respect to the first powder to obtain a mixed powder according to Example 9 (content of the second powder based on the total amount of the mixed powder: 20% by volume).

Comparative Examples 1 to 5

Powders according to Comparative Examples 1 to 5 were obtained in the same manner as in Example 1 except that the blending amounts of the raw materials were set to the compositions shown in Table 2, and further, in the crystallization step, crystallization was performed using an electric furnace at a furnace temperature of 800° C. for a holding time of 4 hours at 800° C.

Comparative Example 6

A powder according to Comparative Example 6 was obtained in the same manner as in Example 1 except that the amounts of the raw materials were changed to the compositions shown in Table 2.

Comparative Example 7

A powder according to Comparative Example 7 was obtained in the same manner as in Example 8 except that the amounts of the raw materials were changed to the compositions shown in Table 2.

Comparative Example 8

A first powder was prepared in the same manner as in Comparative Example 2, and a second powder was mixed in the same manner as in Example 10 to obtain a mixed powder according to Comparative Example 8.

Each property of the crystallized powder was evaluated by the following method. The evaluation results are shown in Tables 1 to 2.
[Identification of Crystalline Phase]

Identification of the crystalline phase contained in the powder after crystallization and determination of the content were performed by powder X-ray diffraction measurement/Rietveld method. A horizontal sample type multipurpose X-ray diffraction apparatus (RINT-UltimaIV, manufactured by Rigaku Corporation) was used as an apparatus, and the measurement was performed under the conditions of a Cuk α X-ray source, a tube voltage of 40 kV, a tube current of 40 mA, a scan speed of 5.0 deg./min, and a 2θ scan range of 10 deg. to 80 deg. The X-ray diffraction pattern of the powder of Example 2 is shown in FIG. 1. For the quantitative analysis of the crystalline phase, Rietveld method software (integrated powder X-ray software Jade+9.6, manufactured by MDI) was used. The content b (% by mass) of the β-quartz solid solution phase was calculated by the following formula (2) using the ratio a (% by mass) of the β-quartz solid solution obtained by Rietveld analysis by X-ray diffraction measurement of a sample obtained by adding 50% by mass (based on the total amount of the sample after addition) of α-alumina (internal standard substance), which is a standard sample for X-ray diffraction manufactured by NIST, to the crystallized powder. The crystal structure of the β-quartz solid solution of the obtained powder was subjected to Rietveld analysis as $Zn_{x/2}Al_xSi_{3-x}O_6$ (x=1) with reference to the conventional technique (for example, Journal of Non-Crystalline Solids 351 149 (2005) The quantitative analysis of the crystalline phase was performed for all Examples and Comparative Examples, and the results are shown in Tables 1 to 2.

$$b = 100a/(100-a) \quad (2)$$

[Analysis of ZnO, $Al_2O_3$ and $SiO_2$, and Quantification of Impurities]

The analysis of ZnO, $Al_2O_3$ and $SiO_2$ (content analysis) and the quantification of impurities were performed by inductively coupled plasma emission spectroscopy. An ICP emission spectrometer (CIROS-120, manufactured by SPECTRO) was used as an analyzer. In the analysis of ZnO, $Al_2O_3$, $SiO_2$, 0.01 g of the powder was weighed in a platinum crucible, melted with a flux obtained by mixing potassium carbonate, sodium carbonate, and boric acid, and then dissolved by adding hydrochloric acid to prepare a measurement solution. In the analysis of impurities, 0.1 g of the powder was weighed in a platinum crucible and subjected to pressure acid decomposition at 200° C. using hydrofluoric acid and sulfuric acid to prepare a measurement solution.

[Average Circularity]

The powder was fixed to a sample stage with a carbon tape, coated with osmium, and photographed with a scanning electron microscope (JSM-7001F SHL, manufactured by JEOL Ltd.) at a magnification of 500 to 5000 times and the number of pixels of 2048×1356. Using an image analyzer (Image-Pro Premier Ver. 9.3, manufactured by Nippon Roper Co., Ltd.), the projected area (S) of the particles (powder particles) and the projected peripheral length (L) of the particles were calculated, and then the circularity was calculated from the following formula (1). The circularity of each particle in an arbitrary observation area containing 100 or more particles was determined, and the average value thereof was defined as the average circularity.

$$\text{Circularity} = 4\pi S/L^2 \quad (1)$$

[Average Particle Diameter of First Powder]

The average particle diameter was measured using a laser diffraction particle size distribution analyzer (Beckman Coulter, LS 13 320). 50 $cm^3$ of pure water and 0.1 g of the obtained powder were placed in a glass beaker, and a dispersion treatment was performed for 1 minute using an ultrasonic homogenizer (SFX 250, manufactured by BRANSON). The dispersion liquid of the powder subjected to the dispersion treatment was added dropwise to a laser diffraction particle size distribution measuring apparatus with a dropper, and measurement was performed 30 seconds after a predetermined amount of the dispersion liquid was added. The particle size distribution was calculated from the data of the light intensity distribution of the diffracted/scattered light by the particles detected by the sensor in the laser diffraction particle size distribution measuring apparatus. The average particle diameter was determined by multiplying the measured particle diameter by the relative particle amount (difference %) and dividing by the total relative particle amount (100%). Here, "%" means "% by volume".

[Viscosity]

A bisphenol A-type liquid epoxy resin (JER 828, manufactured by Mitsubishi Chemical Corporation) was mixed such that the powder (in the case of the mixed powder, the total of the first powder and the second powder) was 50% by volume of the whole, and the mixture was kneaded with a planetary stirrer ("Awatori Rentaro AR-250", manufactured by Thinky Corporation, rotation speed: 2000 rpm) to prepare a resin composition. The viscosity of the obtained resin composition was measured under the following conditions using a rheometer (MCR 300, manufactured by Nihon Sibermheguna Co., Ltd.).

Plate shape: circular flat plate 25 mmφ)
Sample thickness: 1 mm
Temperature: 25±1° C.
Shear rate: 1 $s^{-1}$

[Thermal Expansion Coefficient of Resin Composition]

A resin composition was prepared by mixing bismaleimide (manufactured by Kei Kasei Co., Ltd.) and an allyl novolac type phenol resin (manufactured by Meiwa Kasei Co., Ltd.) at an equivalent ratio of bismaleimide:allyl novolac type phenol resin=1:0.9. The powder or the mixed powder and the resin composition were mixed such that the powder or the mixed powder obtained in each of Examples and Comparative Examples was 60% by volume of the whole, melted at 160° C., and cured at 220 ° C. for 5 hours, and then the thermal expansion coefficient of the resin composition was evaluated by a TMA apparatus (TMA4000SA, manufactured by Bruker AXS). As the measurement conditions, the heating rate was set to 3° C./min, the measurement temperature was set to −10° C. to 280° C., the atmosphere was set to a nitrogen atmosphere. The thermal expansion coefficient at 20° C. to 200° C. was calculated from the obtained results. The thermal expansion coefficient of the resin composition in a state where the powder or the mixed powder was not mixed was $49 \times 10^{-6}$/° C.

TABLE 1

|  |  |  | Unit | Example 1 | Example 2 | Example 3 | Example 4 | Example 5 |
|---|---|---|---|---|---|---|---|---|
| First powder | Amount | ZnO | % by mole | 28 | 28 | 35 | 32 | 40 |
|  |  | $Al_2O_3$ | % by mole | 18 | 18 | 11 | 18 | 10 |
|  |  | $SiO_2$ | % by mole | 54 | 54 | 54 | 50 | 50 |

TABLE 1-continued

|  |  |  | Unit | | | | | |
|---|---|---|---|---|---|---|---|---|
|  | Powder composition (after crystallization step) | ZnO | % by mole | 27 | 27 | 34 | 32 | 39 |
|  |  | Al$_2$O$_3$ | % by mole | 18 | 18 | 11 | 18 | 11 |
|  |  | SiO$_2$ | % by mole | 55 | 55 | 55 | 50 | 50 |
|  | Main crystalline phase |  | — | β-quartz solid solution | β-quartz solid solution | β-quartz solid solution | β-quartz solid solution | β-quartz solid solution |
|  | Content of β-quartz solid solution phase |  | % by mass | 65 | 85 | 85 | 85 | 80 |
|  | Average particle diameter |  | μm | 6 | 5 | 6 | 5 | 7 |
|  | Amount of impurities | Li | ppm by mass | 8 | 9 | 6 | 8 | 8 |
|  |  | Na |  | 65 | 70 | 65 | 65 | 68 |
|  |  | K |  | 38 | 32 | 33 | 37 | 29 |
|  | Average circularity |  | — | 0.80 | 0.90 | 0.90 | 0.80 | 0.85 |
| Second powder | Average particle diameter (D$_{50}$) |  | μm | — | — | — | — | — |
|  | Average circularity |  | — | — | — | — | — | — |
| Thermal expansion coefficient of resin composition |  |  | 10$^{-6}$/° C. | 19 | 14 | 14 | 14 | 15 |
| Viscosity of resin composition |  |  | Pa · s | 2500 | 950 | 1100 | 2200 | 1400 |

|  |  |  | Unit | Example 6 | Example 7 | Example 8 | Example 9 | Example 10 |
|---|---|---|---|---|---|---|---|---|
| First powder | Amount | ZnO | % by mole | 22 | 30 | 28 | 28 | 28 |
|  |  | Al$_2$O$_3$ | % by mole | 18 | 10 | 18 | 18 | 18 |
|  |  | SiO$_2$ | % by mole | 60 | 60 | 54 | 54 | 54 |
|  | Powder composition (after crystallization step) | ZnO | % by mole | 22 | 29 | 27 | 27 | 27 |
|  |  | Al$_2$O$_3$ | % by mole | 18 | 11 | 18 | 18 | 18 |
|  |  | SiO$_2$ | % by mole | 60 | 60 | 55 | 55 | 55 |
|  | Main crystalline phase |  | — | β-quartz solid solution | β-quartz solid solution | β-quartz solid solution | β-quartz solid solution | β-quartz solid solution |
|  | Content of β-quartz solid solution phase |  | % by mass | 80 | 75 | 85 | 85 | 85 |
|  | Average particle diameter |  | μm | 5 | 6 | 7 | 7 | 5 |
|  | Amount of impurities | Li | ppm by mass | 8 | 6 | 9 | 9 | 9 |
|  |  | Na |  | 69 | 63 | 80 | 80 | 70 |
|  |  | K |  | 25 | 33 | 35 | 35 | 32 |
|  | Average circularity |  | — | 0.90 | 0.80 | 0.70 | 0.70 | 0.90 |
| Second powder | Average particle diameter (D$_{50}$) |  | μm | — | — | — | 40 | 0.3 |
|  | Average circularity |  | — | — | — | — | 0.95 | 0.95 |
| Thermal expansion coefficient of resin composition |  |  | 10$^{-6}$/° C. | 16 | 17 | 14 | 17 | 16 |
| Viscosity of resin composition |  |  | Pa · s | 1100 | 2500 | 11000 | 3900 | 450 |

TABLE 2

|  |  |  | Unit | Comp. Example 1 | Comp. Example 2 | Comp. Example 3 | Comp. Example 4 |
|---|---|---|---|---|---|---|---|
| First powder | Amount | ZnO | % by mole | 23 | 16 | 30 | 47 |
|  |  | Al$_2$O$_3$ | % by mole | 11 | 20 | 22 | 8 |
|  |  | SiO$_2$ | % by mole | 66 | 64 | 48 | 45 |
|  | Powder composition (after crystallization step) | ZnO | % by mole | 22 | 15 | 30 | 46 |
|  |  | Al$_2$O$_3$ | % by mole | 12 | 20 | 22 | 9 |
|  |  | SiO$_2$ | % by mole | 66 | 65 | 48 | 45 |

TABLE 2-continued

|  |  | Unit |  |  |  |  |
|---|---|---|---|---|---|---|
| | Main crystalline phase | — | β-quartz solid solution | β-quartz solid solution, gahnite | β-quartz solid solution, mullite | β-quartz solid solution, ZnO—SiO$_2$ based compound, willemite |
| | Content of β-quartz solid solution phase | % by mass | 60 | 20 | 30 | 40 |
| | Average particle diameter | μm | 6 | 5 | 7 | 6 |
| | Amount of impurities Li | ppm by mass | 9 | 8 | 6 | 8 |
| | Na | | 61 | 65 | 70 | 65 |
| | K | | 30 | 35 | 28 | 30 |
| | Average circularity | — | 0.85 | 0.80 | 0.90 | 0.80 |
| Second powder | Average particle diameter (D$_{50}$) | μm | — | — | — | — |
| | Average circularity | — | — | — | — | — |
| | Thermal expansion coefficient of resin composition | 10$^{-6}$/° C. | 20 | 23 | 22 | 21 |
| | Viscosity of resin composition | Pa·s | 1500 | 2300 | 950 | 2400 |

|  |  | Unit | Comp. Example 5 | Comp. Example 6 | Comp. Example 7 | Comp. Example 8 |
|---|---|---|---|---|---|---|
| First powder | Amount ZnO | % by mole | 30 | 16 | 16 | 16 |
| | Al$_2$O$_3$ | % by mole | 7 | 20 | 20 | 20 |
| | SiO$_2$ | % by mole | 63 | 64 | 64 | 64 |
| | Powder composition (after crystallization step) ZnO | % by mole | 30 | 15 | 15 | 15 |
| | Al$_2$O$_3$ | % by mole | 7 | 20 | 20 | 20 |
| | SiO$_2$ | % by mole | 63 | 65 | 65 | 65 |
| | Main crystalline phase | — | β-quartz solid solution, gahnite | β-quartz solid solution, gahnite | β-quartz solid solution, gahnite | β-quartz solid solution, gahnite |
| | Content of β-quartz solid solution phase | % by mass | 30 | 5 | 20 | 20 |
| | Average particle diameter | μm | 5 | 8 | 9 | 5 |
| | Amount of impurities Li | ppm by mass | 8 | 9 | 8 | 8 |
| | Na | | 68 | 65 | 65 | 65 |
| | K | | 32 | 33 | 30 | 35 |
| | Average circularity | — | 0.85 | 0.80 | 0.70 | 0.80 |
| Second powder | Average particle diameter (D$_{50}$) | μm | — | — | — | 0.3 |
| | Average circularity | — | — | — | — | 0.95 |
| | Thermal expansion coefficient of resin composition | 10$^{-6}$/° C. | 22 | 25 | 23 | 22 |
| | Viscosity of resin composition | Pa·s | 1300 | 1300 | 11000 | 500 |

The resin compositions containing the powders or mixed powders of Examples 1 to 10 had a lower thermal expansion coefficient than the resin compositions containing the powders or mixed powders of Comparative Examples 1 to 8.

INDUSTRIAL APPLICABILITY

The powder or the mixed powder of the present invention can be used as a filler capable of reducing the thermal expansion coefficient of a base material when the powder or the mixed powder is filled in the base material such as a glass or a resin. In addition, the base material containing the powder or the mixed powder of the present invention has low viscosity and high fluidity, and thus can be used as a filler that can be highly filled.

The invention claimed is:

1. A powder comprising three components of ZnO, Al$_2$O$_3$ and SiO$_2$, wherein each content of the three components is ZnO: 27 to 34% by mole, Al$_2$O$_3$: 11 to 18% by mole and SiO$_2$: 50 to 55% by mole, based on the sum of the contents of the three components.

2. The powder according to claim 1, having an average circularity of 0.70 or more.

3. The powder according to claim 1, comprising 85% by mass of a β-quartz solid solution as a crystalline phase, based on the total amount of the powder.

4. The powder according to claim 1, wherein each content of Li, Na and K is less than 100 ppm by mass based on the total amount of the powder.

5. A blend of the powder according to claim 1 in combination with a glass or a resin.

6. A mixed powder comprising:
a first powder being the powder according to claim 1; and
a second powder being different from the first powder.

7. The mixed powder according to claim 6, wherein an average circularity of the second powder is 0.80 or more.

8. The mixed powder according to claim 6, wherein a content of the first powder is 10% by volume or more based on the total amount of the mixed powder.

9. The mixed powder according to-claim 6, wherein the second powder is a silica powder or an alumina powder.

10. A blend of the mixed powder according to claim 6 in combination with a glass or a resin.

11. The powder according to claim 1, wherein each content of the three components is ZnO: 27-32% by mole, $Al_2O_3$: 11 to 18% by mole and $SiO_2$: 50 to 55% by mole, based on the sum of the contents of the three components.

12. The powder according to claim 1, consisting of the three components and inevitable impurities.

13. The powder according to claim 11, consisting of the three components and inevitable impurities.

\* \* \* \* \*